(12) United States Patent
Zhang et al.

(10) Patent No.: US 12,555,027 B2
(45) Date of Patent: Feb. 17, 2026

(54) EXPERT SYSTEM ENRICHMENT THROUGH RULE REFINEMENT

(71) Applicant: International Business Machines Corporation, Armonk, NY (US)

(72) Inventors: Xue Ying Zhang, Xian (CN); Jing Xu, Xian (CN); Si Er Han, Xian (CN); Xiao Ming Ma, Xian (CN); Ji Hui Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1271 days.

(21) Appl. No.: 17/184,605

(22) Filed: Feb. 25, 2021

(65) Prior Publication Data

US 2022/0269983 A1    Aug. 25, 2022

(51) Int. Cl.
*G06N 20/00* (2019.01)
*G06N 5/022* (2023.01)
*G06N 5/025* (2023.01)

(52) U.S. Cl.
CPC ............. *G06N 20/00* (2019.01); *G06N 5/022* (2013.01)

(58) Field of Classification Search
CPC ......... G06N 20/00; G06N 5/022; G06N 5/025
See application file for complete search history.

(56) References Cited

U.S. PATENT DOCUMENTS

| | | | |
|---|---|---|---|
| 5,642,471 A * | 6/1997 | Paillet | G06N 5/047 706/47 |
| 9,542,532 B1 | 1/2017 | Mcnair | |
| 10,185,728 B2 * | 1/2019 | Nath | G06F 16/122 |
| 2012/0259962 A1 * | 10/2012 | Bose | G06F 11/076 709/223 |

(Continued)

OTHER PUBLICATIONS

Alonso et al., "Increasing the Efficiency of Rule-Based Expert Systems Applied on Heterogeneous Data Sources," Application of Expert Systems—Theoretical and Practical Aspects, Dec. 2019, 10 pages. <https://www.researchgate.net/publication/338223379_Increasing_the_Efficiency_of_Rule-Based_Expert_Systems_Applied_on_Heterogeneous_Data_Sources>.

(Continued)

*Primary Examiner* — Kamran Afshar
*Assistant Examiner* — Steven Phung
(74) *Attorney, Agent, or Firm* — Eric W. Chesley

(57) ABSTRACT

A system, computer program product, and method are presented for enriching existing legacy expert systems through refinement of existing rules therein. The method includes identifying a legacy expert system to be enriched, relevant training data, existing rules embedded within the legacy expert system, and, for each existing rule, one or more antecedent factors. The method also includes determining the existing rules do not meet a threshold value for established quality requirements, thereby identifying one or more low-quality rules. The method further includes identifying frequent sets of antecedent factors associated with (Continued)

each low-quality rule, where each frequent set of antecedent factors is established as a frequent set through at least meeting a threshold frequency of occurrence within the training data. The method also includes comparing the antecedent factors of each existing rule with the frequent sets of antecedent factors, and enriching the legacy expert system through refining the existing rules.

20 Claims, 14 Drawing Sheets

(56) References Cited

U.S. PATENT DOCUMENTS

| | | | |
|---|---|---|---|
| 2014/0304408 A1* | 10/2014 | Rhee | H04L 43/04 |
| | | | 709/224 |
| 2018/0173733 A1* | 6/2018 | Nath | G06N 5/025 |
| 2018/0240552 A1 | 8/2018 | Tuyl | |
| 2019/0012602 A1 | 1/2019 | Mishra | |
| 2020/0278901 A1* | 9/2020 | Singh | G06N 5/02 |

OTHER PUBLICATIONS

Djenouri et al., "An Efficient Measure for Evaluating Association Rules," 2014 6th International Conference of Soft Computing and Pattern Recognition (SoCPaR), Aug. 11-14, 2014, pp. 406-410. <https://www.researchgate.net/profile/Youcef_Djenouri3/publication/270816990_New_Measure_for_Evaluating_Association_Rules/links/59b297d80f7e9b37434e85c5/New-Measure-for-Evaluating-Association-Rules.pdf>.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

[From FIG. 6A]
Save high-quality rules with measure statistics

614

⑦

660
[From FIG. 6D]
Transmit refined rules to user for review and rules addition determination

⑧

676
[From FIG. 6D]
Transmit refined rules to user for review and rules addition determination

⑨

694
[From FIG. 6E]
Transmit new rules to user for review and rules addition determination

⑩

699
Assemble the enriched expert system

FIG. 6F

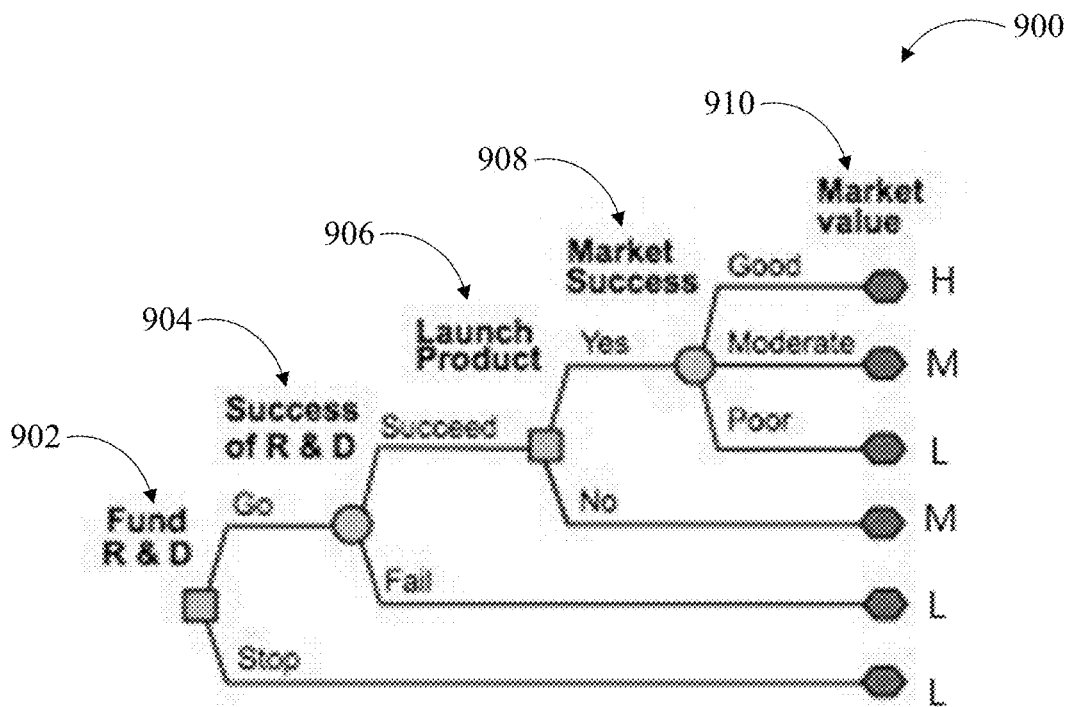

FIG. 9

| Antecedents | Predictions/Recommendations |
|---|---|
| Fund R&D = STOP | Market Value = Low (L) |
| Fund R&D = GO AND Success of R&D = FAIL | Market Value = Low (L) |
| Fund R&D = GO AND Success of R&D = SUCCEED AND Launch Product = NO | Market Value = Moderate (M) |
| Fund R&D = GO AND Success of R&D = SUCCEED AND Launch Product = YES AND Market Success = POOR | Market Value = Low (L) |
| Fund R&D = GO AND Success of R&D = SUCCEED AND Launch Product = YES AND Market Success = MODERATE | Market Value = Moderate (M) |
| Fund R&D = GO AND Success of R&D = SUCCEED AND Launch Product = YES AND Market Success = GOOD | Market Value = High (H) |

FIG. 10

EXPERT SYSTEM ENRICHMENT THROUGH RULE REFINEMENT

BACKGROUND

The present disclosure relates to expert systems, and, more specifically, to enriching existing legacy expert systems through refinement of existing rules therein.

Many known expert systems are used to approximate the performance of human subject matter experts. In general, an expert system is a computer program that is designed to emulate and mimic human intelligence, skills, and behaviors. Many known modern expert systems are trained through a machine learning algorithm exercising massive volumes of data. In contrast, many known legacy expert systems were implemented through imparting knowledge from a human expert to a knowledge engineer, who would then populate a knowledge base that would include data, facts, and rules for a certain topic, industry, or skill, usually equivalent to that of a human expert. The information in the knowledge base is used by an inference engine to generate responses to inquiries, where the inference engine uses the facts and rules in the knowledge base to find and learn new knowledge or patterns, such that the responses emulate those of a human expert for the particular field. Expert systems, both legacy and modern, have advantages over human experts for reasons that include, without limitation, nearly always available, regardless of the day and time, and without the physical limitation of a human.

SUMMARY

A system, computer program product, and method are provided for enriching existing legacy expert systems.

In one aspect, a computer system is provided for enriching existing legacy expert systems. The system includes one or more processing devices and at least one memory device operably coupled to the one or more processing devices. The one or more processing devices are configured to identify a legacy expert system to be enriched and identify training data that is at least partially relevant to enriching the legacy expert system. The one or more processing devices are also configured to identify one or more existing rules embedded within the legacy expert system and identify, for each existing rule of the one or more existing rules, one or more antecedent factors. The one or more processing devices are further configured to determine at least a first portion of the existing rules of the one or more existing rules do not meet a threshold value for established quality requirements, thereby to identify one or more low-quality rules. The one or more processing devices are also configured to identify one or more frequent sets of antecedent factors associated with each low-quality rule of the one or more low-quality rules. Each frequent set of antecedent factors of the one or more frequent sets of antecedent factors is established as a frequent set through at least meeting a threshold frequency of occurrence within the training data. The one or more processing devices are further configured to compare the one or more antecedent factors of each existing rule of the one or more existing rules with the one or more frequent sets of antecedent factors and enrich the legacy expert system through refinement of the one or more existing rules.

In another aspect, a computer program product is provided for enriching existing legacy expert systems. The computer program product includes one or more computer readable storage media, and program instructions collectively stored on the one or more computer storage media. The product also includes program instructions to identify a legacy expert system to be enriched and program instructions to identify training data that is at least partially relevant to enriching the legacy expert system. The product further includes program instructions to identify one or more existing rules embedded within the legacy expert system and program instructions to identify, for each existing rule of the one or more existing rules, one or more antecedent factors. The product also includes program instructions to determine one or more portions of the existing rules of the one or more existing rules do not meet a threshold value for established quality requirements, thereby to identify one or more low-quality rules. The product further includes program instructions to identify one or more frequent sets of antecedent factors associated with each low-quality rule of the one or more low-quality rules. Each frequent set of antecedent factors of the one or more frequent sets of antecedent factors is established as a frequent set through at least meeting a threshold frequency of occurrence within the training data. The product also includes program instructions to compare the one or more antecedent factors of each existing rule of the one or more existing rules with the one or more frequent sets of antecedent factors, and program instructions to enrich the legacy expert system through refinement of the one or more existing rules.

In yet another aspect, a computer-implemented method is provided for enriching existing legacy expert systems. The method include identifying a legacy expert system to be enriched and identifying training data that is at least partially relevant to enriching the legacy expert system. The method also includes identifying one or more existing rules embedded within the legacy expert system and identifying, for each existing rule of the one or more existing rules, one or more antecedent factors. The method further includes determining at least a first portion of the existing rules of the one or more existing rules do not meet a threshold value for established quality requirements, thereby identifying one or more low-quality rules. The method also includes identifying one or more frequent sets of antecedent factors associated with each low-quality rule of the one or more low-quality rules. Each frequent set of antecedent factors of the one or more frequent sets of antecedent factors is established as a frequent set through at least meeting a threshold frequency of occurrence within the training data. The method further includes comparing the one or more antecedent factors of each existing rule of the one or more existing rules with the one or more frequent sets of antecedent factors and enriching the legacy expert system through refining the one or more existing rules.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

FIG. 6F is a continuation of the flowchart from FIGS. 6A-E, in accordance with some embodiments of the present disclosure.

FIG. 9 is a graphical diagram illustrating an example decision tree, in accordance with some embodiments of the present disclosure.

FIG. 10 is a tabular diagram illustrating an example rule set derived from the example decision tree shown in FIG. 9, in accordance with some embodiments of the present disclosure.

Figure 1:
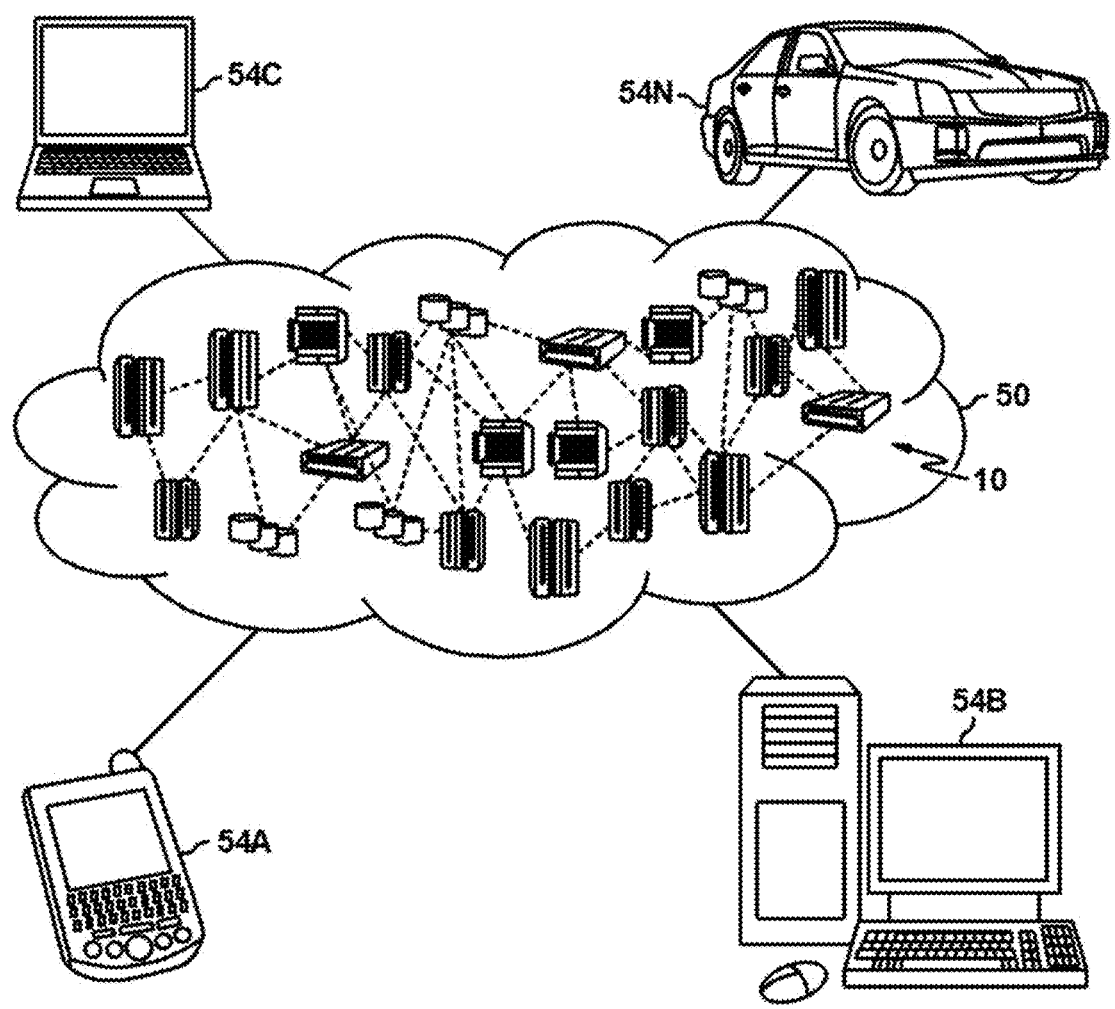
FIG. 1 is a schematic diagram illustrating a cloud computer environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments. In addition, it will be appreciated that, although specific embodiments have been described herein for purposes of illustration, various modifications may be made without departing from the spirit and scope of the embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
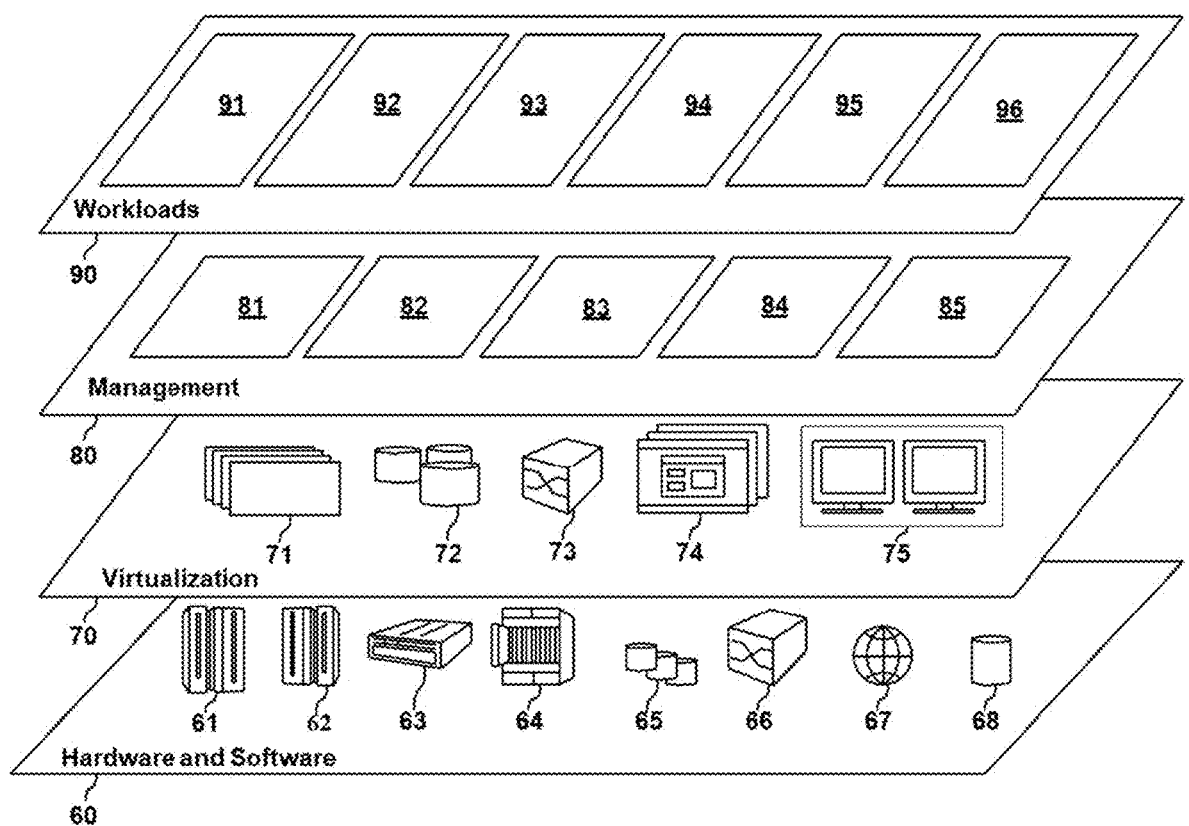
FIG. 2 is a block diagram illustrating a set of functional abstraction model layers provided by the cloud computing environment, in accordance with some embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and to enriching existing legacy expert systems through refinement of existing rules therein 96.

Figure 3:
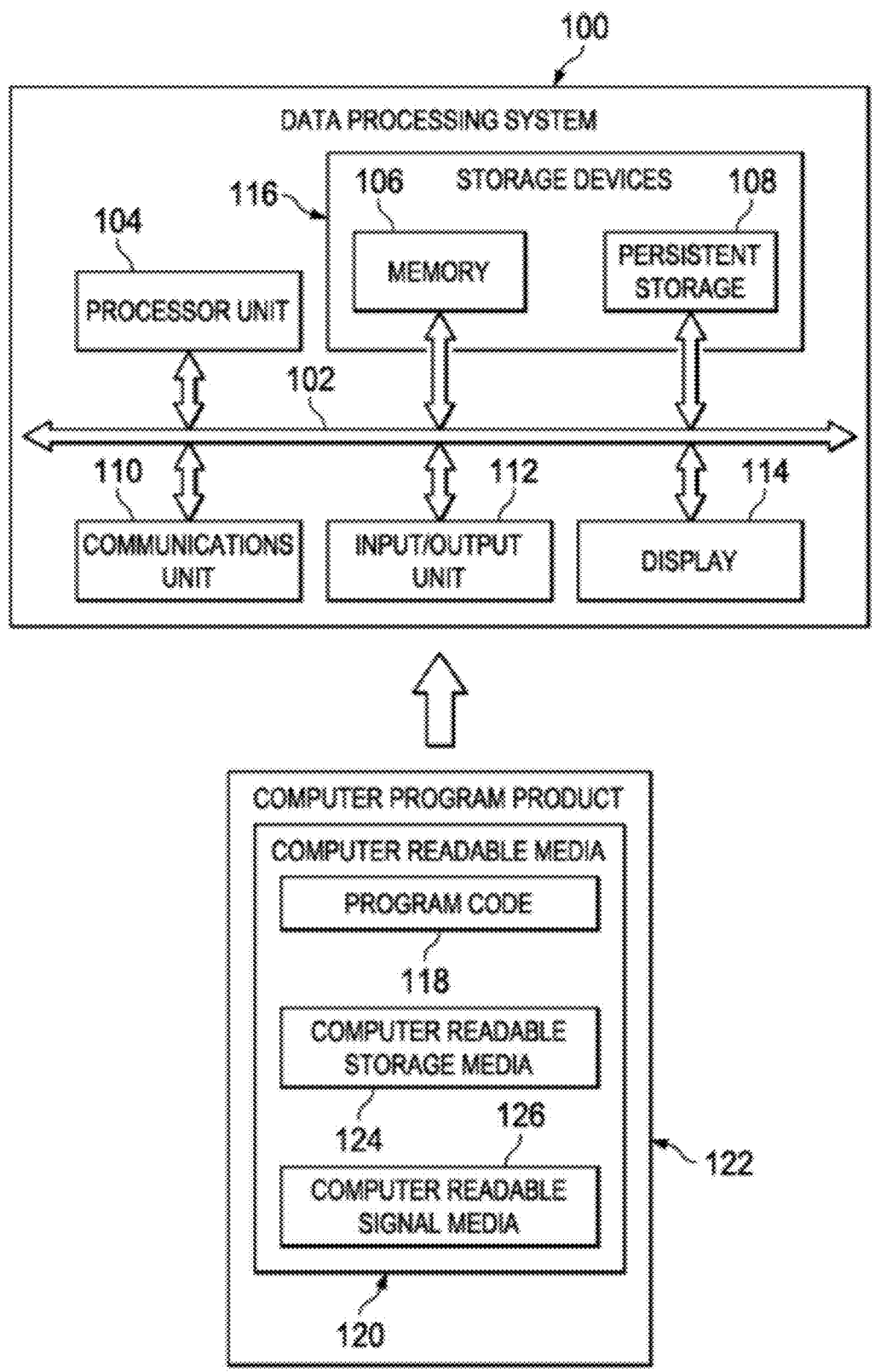
FIG. 3 is a block diagram illustrating a computer system/server that may be used as a cloud-based support system, to implement the processes described herein, in accordance with some embodiments of the present disclosure.

Referring to FIG. 3, a block diagram of an example data processing system, herein referred to as computer system 100, is provided. System 100 may be embodied in a computer system/server in a single location, or in at least one embodiment, may be configured in a cloud-based system sharing computing resources. For example, and without limitation, the computer system 100 may be used as a cloud computing node 10.

Aspects of the computer system 100 may be embodied in a computer system/server in a single location, or in at least one embodiment, may be configured in a cloud-based system sharing computing resources as a cloud-based support system, to implement the system, tools, and processes described herein. The computer system 100 is operational with numerous other general purpose or special purpose computer system environments or configurations. Examples of well-known computer systems, environments, and/or configurations that may be suitable for use with the computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The computer system 100 may be described in the general context of computer system-executable instructions, such as program modules, being executed by the computer system 100. Generally, program modules may include routines, programs, objects, components, logic, data structures, and so on that perform particular tasks or implement particular abstract data types. The computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system 100 is shown in the form of a general-purpose computing device. The components of the computer system 100 may include, but are not limited to, one or more processors or processing devices 104 (sometimes referred to as processors and processing units), e.g., hardware processors, a system memory 106 (sometimes referred to as a memory device), and a communications bus 102 that couples various system components including the system memory 106 to the processing device 104. The communications bus 102 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system 100 typically includes a variety of computer system readable media. Such media may be any available media that is accessible by the computer system 100 and it includes both volatile and non-volatile media, removable and non-removable media. In addition, the computer system 100 may include one or more persistent storage devices 108, communications units 110, input/output (I/O) units 112, and displays 114.

The processing device 104 serves to execute instructions for software that may be loaded into the system memory 106. The processing device 104 may be a number of processors, a multi-core processor, or some other type of processor, depending on the particular implementation. A number, as used herein with reference to an item, means one or more items. Further, the processing device 104 may be implemented using a number of heterogeneous processor systems in which a main processor is present with secondary processors on a single chip. As another illustrative example, the processing device 104 may be a symmetric multiprocessor system containing multiple processors of the same type.

The system memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The system memory 106, in these examples, may be, for example, a random access memory or any other suitable volatile or non-volatile storage device. The system memory 106 can include computer system readable media in the form of volatile memory, such as random access memory (RAM) and/or cache memory.

The persistent storage 108 may take various forms depending on the particular implementation. For example, the persistent storage 108 may contain one or more components or devices. For example, and without limitation, the persistent storage 108 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the communication bus 102 by one or more data media interfaces.

The communications unit 110 in these examples may provide for communications with other computer systems or devices. In these examples, the communications unit 110 is a network interface card. The communications unit 110 may provide communications through the use of either or both physical and wireless communications links.

The input/output unit 112 may allow for input and output of data with other devices that may be connected to the computer system 100. For example, the input/output unit 112 may provide a connection for user input through a keyboard, a mouse, and/or some other suitable input device. Further, the input/output unit 112 may send output to a printer. The display 114 may provide a mechanism to display information to a user. Examples of the input/output units 112 that facilitate establishing communications between a variety of devices within the computer system 100 include, without limitation, network cards, modems, and input/output interface cards. In addition, the computer system 100 can communicate with one or more networks such as a local area network (LAN), a general wide area network (WAN), and/or a public network (e.g., the Internet) via a network adapter (not shown in FIG. 3). It should be understood that although not shown, other hardware and/or software components could be used in conjunction with the computer system 100. Examples of such components include, but are not limited to: microcode, device drivers, redundant processing units, external disk drive arrays, RAID systems, tape drives, and data archival storage systems.

Instructions for the operating system, applications and/or programs may be located in the storage devices 116, which are in communication with the processing device 104 through the communications bus 102. In these illustrative examples, the instructions are in a functional form on the persistent storage 108. These instructions may be loaded into the system memory 106 for execution by the processing device 104. The processes of the different embodiments may be performed by the processing device 104 using computer implemented instructions, which may be located in a memory, such as the system memory 106. These instructions are referred to as program code, computer usable program code, or computer readable program code that may be read and executed by a processor in the processing device 104. The program code in the different embodiments may be embodied on different physical or tangible computer readable media, such as the system memory 106 or the persistent storage 108.

The program code 118 may be located in a functional form on the computer readable media 120 that is selectively removable and may be loaded onto or transferred to the computer system 100 for execution by the processing device 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the computer system 100. In some instances, the computer readable storage media 124 may not be removable from the computer system 100.

Alternatively, the program code 118 may be transferred to the computer system 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or computer system through the computer readable signal media 126 for use within the computer system 100. For instance, program code stored in a computer readable storage medium in a server computer system may be downloaded over a network from the server to the computer system 100. The computer system providing the program code 118 may be a server computer, a client computer, or some other device capable of storing and transmitting the program code 118.

The program code 118 may include one or more program modules (not shown in FIG. 3) that may be stored in system memory 106 by way of example, and not limitation, as well as an operating system, one or more application programs, other program modules, and program data. Each of the operating systems, one or more application programs, other program modules, and program data or some combination thereof, may include an implementation of a networking environment. The program modules of the program code 118 generally carry out the functions and/or methodologies of embodiments as described herein.

The different components illustrated for the computer system 100 are not meant to provide architectural limitations to the manner in which different embodiments may be implemented. The different illustrative embodiments may be implemented in a computer system including components in addition to or in place of those illustrated for the computer system 100.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many known expert systems are used to approximate the performance of human subject matter experts. In general, an expert system is a computer program that is designed to emulate and mimic human intelligence, skills, and behaviors. Many known modern expert systems are trained through a machine learning algorithm exercising big data. As used herein, the term "big data" refers to one or more data sets in one or more databases that are so expansive and complex that traditional data processing software typically experiences great difficulty in processing the volumes of data. Big data is often used for processes that include, without limitation, predictive analytics and user behavior analytics to identify insights regarding market behavior, capture features of interest, and optimizing content delivery. In addition, analyses of such big data are important for addressing issues that require extensive knowledges, i.e., expert knowledge. In addition, with the rapid increase of data throughout most fields of human endeavor, new data mining applications apply relatively sophisticated statistical analysis to large databases to help develop more plausible predictions and recommendations. Accordingly, many known modern expert systems are developed through tools such as artificial intelligence technologies and possess expert knowledge in a particular field, topic, and skill.

In contrast, many known legacy expert systems were implemented through imparting knowledge from a human expert to a knowledge engineer, who would then populate a knowledge base that would include data, facts, and rules for a certain topic, industry, or skill, usually equivalent to that of a human expert. The information in the knowledge base is used by an inference engine to generate responses to inquiries, where the inference engine uses the facts and rules in the knowledge base to find and learn new knowledge or patterns, such that the responses emulate those of a human expert for the particular field. However, with the aforementioned rapid increase of data throughout most fields of human endeavor, many known legacy systems are not configured to take advantage of the aforementioned data mining applications. Therefore, many known legacy expert systems are not easy to update with new knowledge, data, and rules. Expert systems, both legacy and modern, have advantages over human experts for reasons that include, without limitation, nearly always available, regardless of the day and time, and without the physical limitation of a human. Accordingly, many owners/users of known legacy expert systems are partial to the respective systems and the estimated costs of migrating to a modern expert system may be cost prohibitive.

A system, computer program product, and method are disclosed and described herein directed enriching existing legacy expert systems through refinement of existing rules therein. In at least some embodiments, rules from a legacy expert system are evaluated through use of relevant big data, i.e., training data to determine statistical measures such as values for confidence, antecedent support, rule support, and lift. The values for the statistical measures are compared to respective threshold values to determine whether the rules are satisfactory or not. For those rules of the legacy expert systems found to be satisfactory, the respective rules are preserved and the respective statistical measures are preserved with the rules, thereby providing at least a partial enrichment to the affected rules.

Also, in some embodiments, the training data is injected into a machine learning (ML)-based expert system enrichment engine to generate one or more machine learning rule models at least partially representative of the injected training data. At least a portion of the respective ML models generate frequent sets, i.e., items such as, and without limitation, antecedent factors associated with the rules. Frequent sets (sometimes referred to as "frequent itemsets") are a form of a frequent patterns established through the respective ML models as a function of meeting or exceeding a threshold frequency of occurrence in the training data through one or more association rule learning algorithms used for discovering interesting relationships between data in large databases. In some embodiments, the frequent sets are determined through one or more of data mining and decision trees.

Further, in some embodiments, at least a portion of the respective ML models generate new rules that are not previously formulated in the legacy expert system and executes a statistical measures analysis on the new rules. If resulting rules have a sufficiently high satisfaction level, i.e., the rules have statistical measure results for confidence, antecedent support, rule support, and lift that meet or exceed the established thresholds, then the respective rules may be proposed to a user for review and possibly adding to the legacy expert system as enrichments thereof.

In some embodiments, some of the respective rules of the legacy expert system might be found to have statistical measurement values below the established user-defined threshold value. Those rules with unsatisfactory antecedent support may be refined with additional antecedent factors and/or undergo removal of redundant antecedent factors for possible refinements to the rules through use of the frequent sets determined as described. Moreover, in some embodiments, for those rules from the legacy expert system that cannot be made satisfactory through the processes described herein, such rules are subject to removal. Accordingly, the use of ML models to enrich the legacy expert systems facilitates generating hybrid expert systems that retain most of the features of the legacy expert system; however, the hybrid expert systems also include enriched rules more emblematic of modern expert systems.

Figure 4:
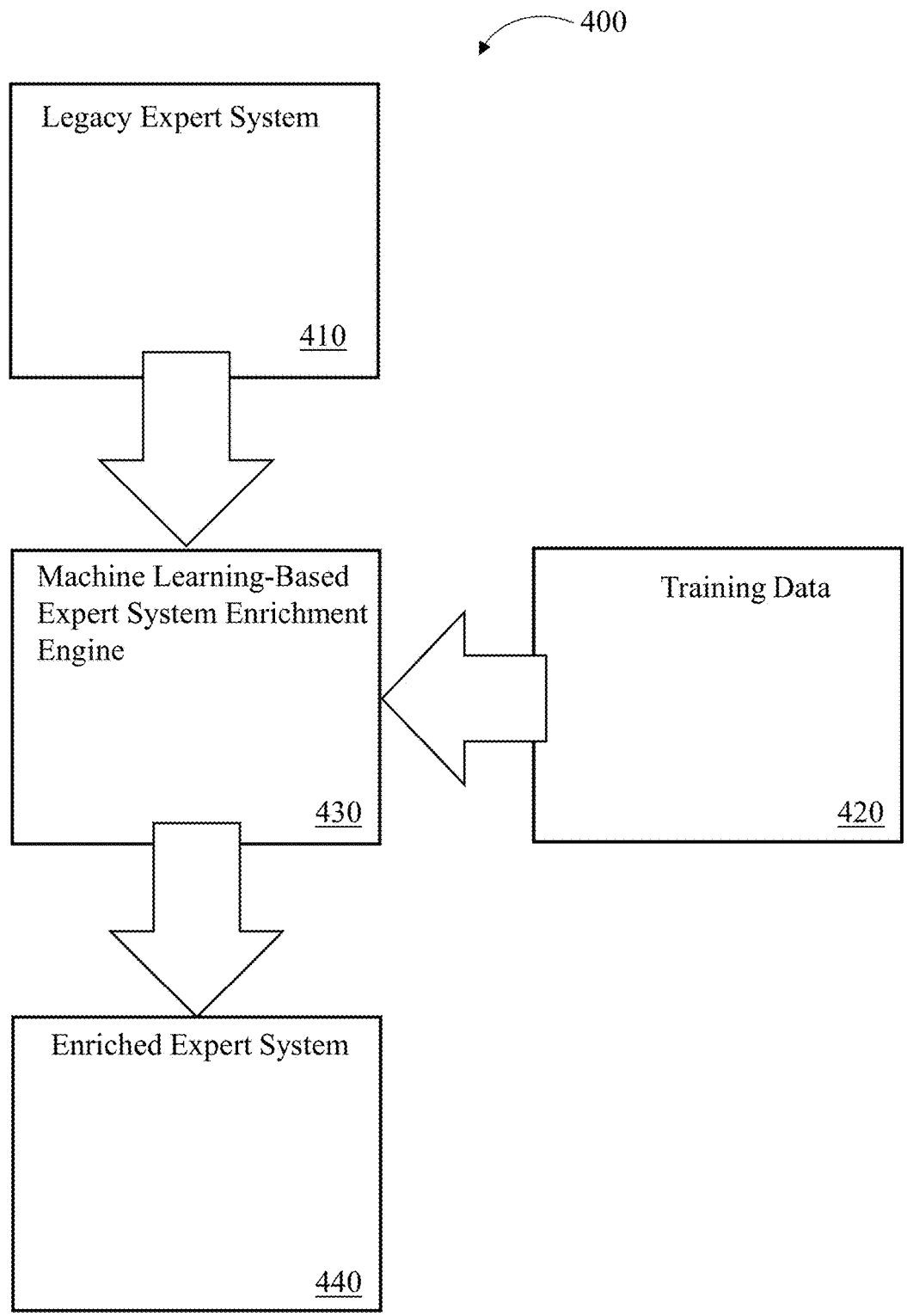
FIG. 4 is a high-level block diagram illustrating a process for enriching existing legacy expert systems through refinement of existing rules therein, in accordance with some embodiments of the present disclosure.

Referring to FIG. 4, a high-level block diagram is provided illustrating a process 400 for enriching existing legacy expert systems, such as a legacy expert system 410 through refinement of the existing rules (not shown in FIG. 4) therein. Training data 420 is injected into a machine learning-based expert system enrichment engine. The training data 420 includes big data as previously described that is at least partially relevant to the area of expertise associated with the legacy expert system 410. The training data 420 may be gathered from one or more sources and, in some embodiments, may include at least a portion of the original knowledge base used to program the legacy expert system 410. The training data 420 is ingested by a machine learning (ML)-based expert system enrichment engine 430 to execute operations resulting in the enriched expert system 440. The details of the process 400 are described with more detail with respect to FIGS. 5 through 10.

Figure 5:
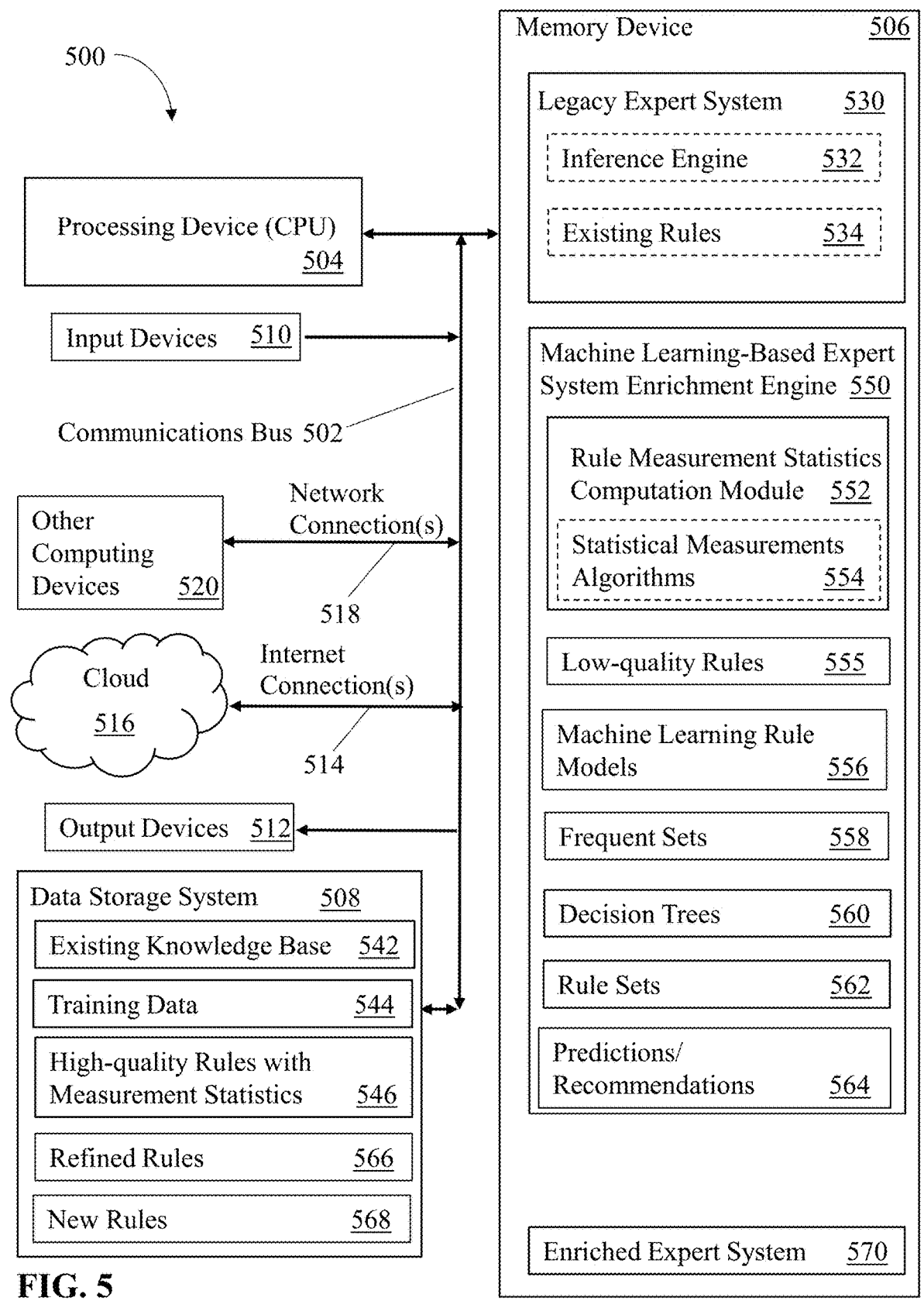
FIG. 5 is a block diagram illustrating a computer system configured for enriching existing legacy expert systems through refinement of existing rules therein, in accordance with some embodiments of the present disclosure.

Referring to FIG. 5, a block diagram is presented illustrating a computer system, i.e., an expert system rules enrichment system 500 (hereon referred to as the system 500) configured to enrich existing legacy expert systems, such as the legacy expert system 410 (shown in FIG. 4) through refinement of existing rules therein. The system 500 includes one or more processing devices 504 (only one shown) communicatively and operably coupled to one or more memory devices 506 (only one shown). The system 500 also includes a data storage system 508 that is communicatively coupled to the processing device 504 and memory device 506 through a communications bus 502. In one or more embodiments, the communications bus 502, the processing device 504, the memory device 506, and the data storage system 508 are similar to their counterparts shown in FIG. 3, i.e., the communications bus 102, the processing device 104, the system memory 106, and the persistent storage devices 108, respectively. The system 500 further includes one or more input devices 510 and one or more output devices 512 communicatively coupled to the communications bus 502. In addition, the system 500 includes one or more Internet connections 514 (only one shown) communicatively coupled to the cloud 516 through the communications bus 502, and one or more network connections 518 (only one shown) communicatively coupled to one or more other computing devices 520 through the communications bus 502.

In one or more embodiments, one or more legacy expert systems 530 (only one shown) (shown as 410 in FIG. 4) are resident within the memory device 506. The legacy expert system 530 includes at least one inference engine 532 therein (only one shown) that is employed as previously described. In some embodiments, the inference engine 532 is resident within the legacy expert system 530 and in some embodiments the inference engine 532 is resident in the memory device 506 separately from the legacy expert system 530. The legacy expert system 530 includes existing rules 534 embedded therein that facilitate generation of predictions and recommendations from the legacy expert system 530.

In at least some embodiments, the data storage system 508 provides persistent storage to features such as, and without limitation, an existing knowledge base 542 that was used to generate the existing rules 534 in the legacy expert system 530 through the inference engine 532. The data storage system 508 may also store the training data 544 (420 in FIG. 4) that is used as described in further detail herein. in some embodiments, the training data 544 includes at least a portion of the original knowledge base 542. The data storage system 508 may further store products of the process 600 (as described with respect to FIGS. 6A-6F) that include, without limitation, high-quality rules 546 with respective measurement statistics, an inventory of refined rules 566, and an inventory of new rules 568.

In many embodiments, the memory device 506 includes a machine learning (ML)-based expert system enrichment engine 550 (i.e., the engine 550) (430 in FIG. 4) that includes many of the tools used to execute a significant portion of the process 600. Such tools include, without limitation, a rule measurement statistics computation module 552 with the respective statistical measurements algorithms 554 embedded therein. The engine 550 further includes tools such as a machine learning (ML) rule models 556. At least a portion of the interim products generated to support the generation of the high-quality rules 546 with respective measurement statistics, refined rules 566, and new rules 568 include, without limitation, low-quality rules 555, frequent sets 558, decision trees 560, rule sets 562, and predictions/recommendations 564.

Furthermore, in embodiments, the memory device 506 includes an enriched expert system 570 (440 in FIG. 4). While the embodiments described herein may identify certain components of the system 500 associated with either the memory device 506 or the data storage system 508, the location of at least some of the components may be associated with interchangeably, and in some embodiments, located in other devices that are communicatively coupled to the system 500 through the network connections 518 and/or the Internet connections 514.

Figure 6A:
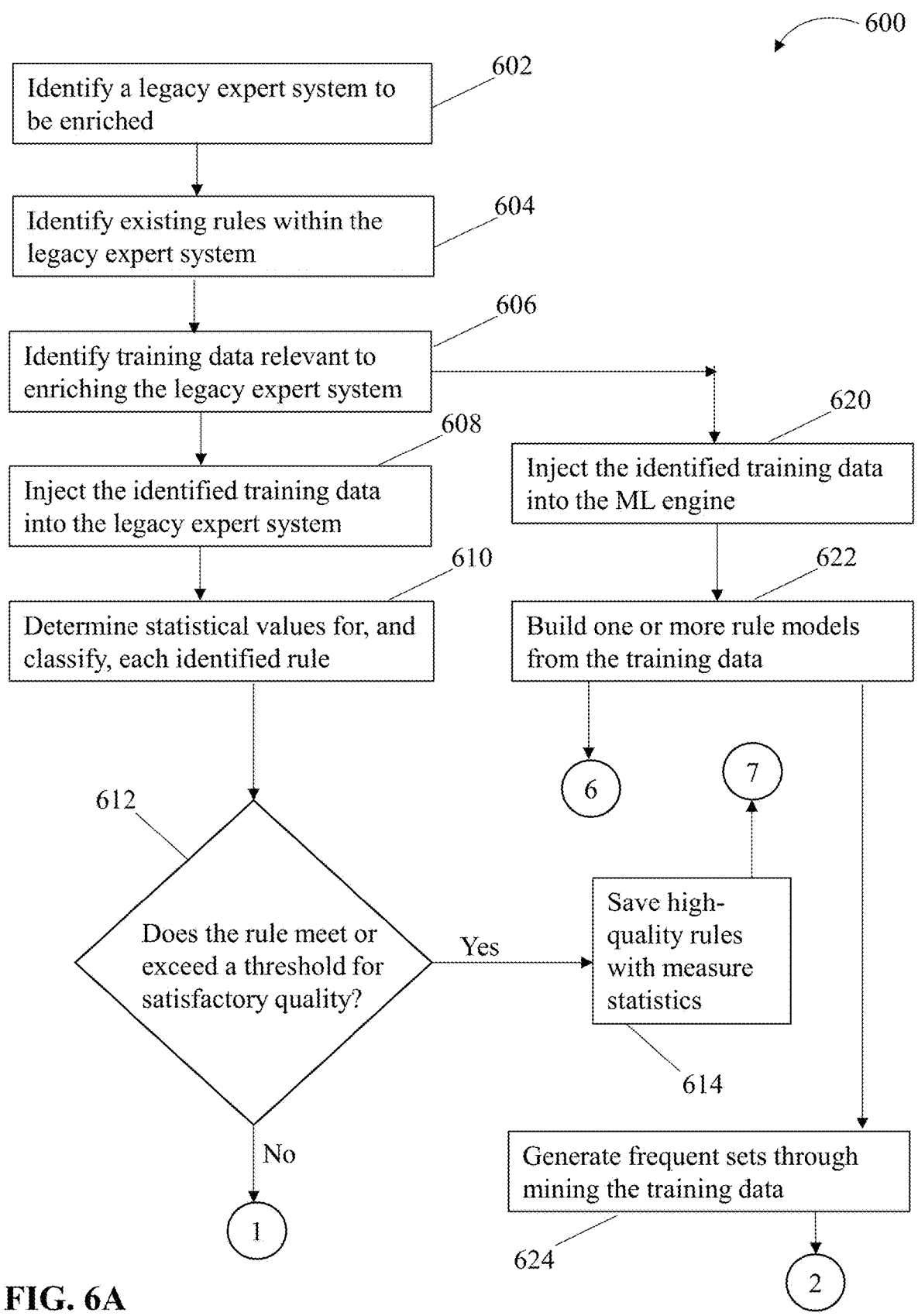
FIG. 6A is a flowchart illustrating a process for enriching existing legacy expert systems through refinement of existing rules therein, in accordance with some embodiments of the present disclosure.

Referring to FIG. 6A, a flowchart is provided illustrating a process 600 for enriching an existing legacy expert system 530 (shown in FIG. 5) through refinement of the existing rules 534 (shown in FIG. 5) therein. Also referring to FIG. 5, the process 600 includes identifying 602 the legacy expert system 530 to be enriched and identifying 604 the existing rules 534 therein. In some embodiments, the existing rules 534 may be extracted from one or more of the inference engine 532 and the existing knowledge base 542. In some embodiments, the training data 544 may also be employed to identify 604 at least a portion of the existing rules 534 through inserting the one or more of the existing knowledge base 542 and the training data 544 through the inference engine 532. In addition, the training data 544 that is relevant to enriching the legacy expert system 530 is identified 606.

Figure 7:
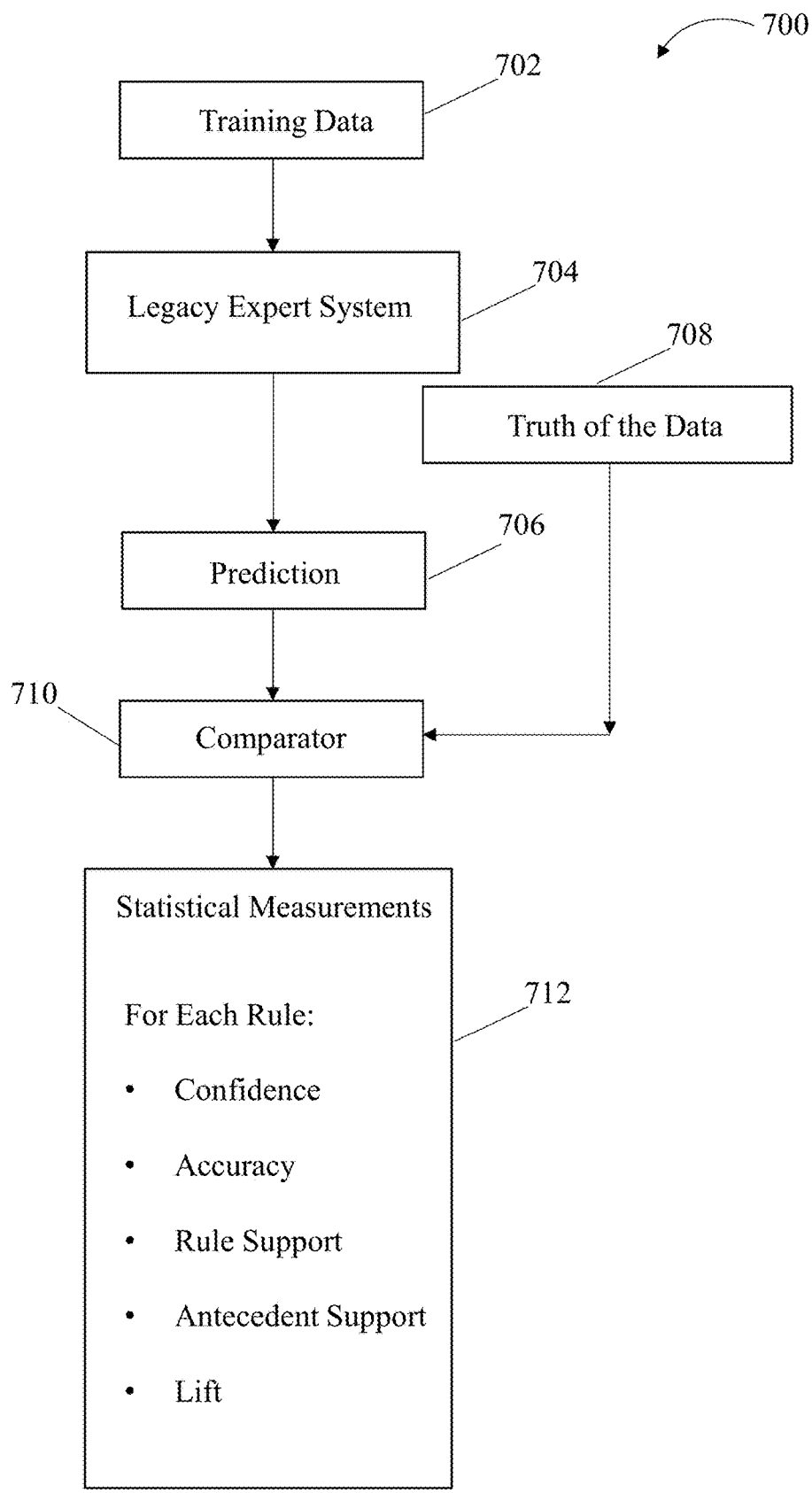
FIG. 7 is a block diagram illustrating a process for determining statistical values for rules of an existing legacy expert system, in accordance with some embodiments of the present disclosure.

Also, referring to FIG. 7, a block diagram is provided illustrating a process 700 for determining statistical values for the existing rules 534 of the existing legacy expert system 530. In embodiments, the identified training data 702 (544 in FIG. 5) is injected 608 into the legacy expert system 704 (530 in FIG. 5) to determine 610 statistical values for classifying each identified existing rule 534. The legacy expert system 704 will generate a prediction 706 that is compared to the truth of the data 708 (sometimes referred to as the "ground truth") through a comparator 710 to generate the values for the statistical measurements 712.

Figure 8:
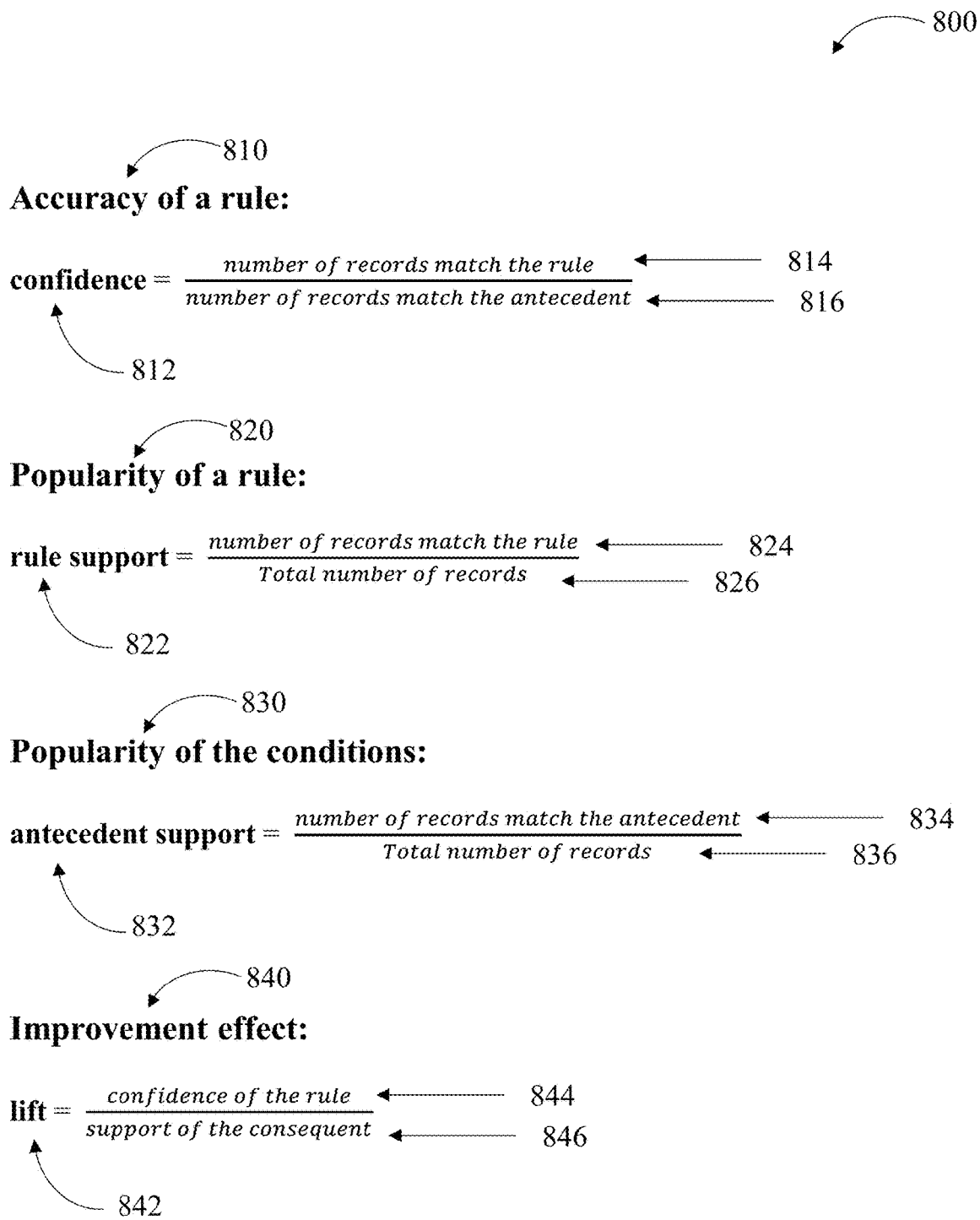
FIG. 8 is a textual diagram illustrating algorithms configured for determining statistical values for rules of an existing legacy expert system, in accordance with some embodiments of the present disclosure.

In addition, also referring to FIG. 8, a textual diagram is provided illustrating the statistical measurement algorithms 800 (shown in FIG. 5 as 554) configured for determining 610 the statistical values for the existing rules 534 of the legacy expert system 530 (704 in FIG. 7). In one or more embodiments, the machine learning-based expert system enrichment engine 550, i.e., the engine 550 includes a rule measurement statistics computation module 552 that is configured to capture data from the existing rules 534 of the legacy expert system 530. Such captured data may include, without limitation, the total number of records in the training data 544 (shown as the denominators 826 and 836) and the values of the respective antecedent factors (i.e., "if-statements") and the respective consequents ("then-statements"). In general, a rule will include one or more antecedent factors and one consequent, however, more than one consequent may also be use. In some embodiments, the rule measurement statistics computation module 552 includes the statistical measurement algorithms 800 resident therein.

In some embodiments, a first statistical measurement algorithm 810 is configured to determine values for the accuracy of the rule through a confidence measurement 812. The confidence measurement 812 includes a ratio of the number of records in the training data 544 (702 in FIG. 7) that match the existing rule 534 as the numerator 814 to the number of records in the training data 544 that match the antecedent factors in the denominator 816. More simply, the ratio of record support to antecedent support is indicative of the proportion of training data with the specified antecedent factor(s) for which the consequent(s) is/are also true. For example, and without limitation, if 900 of the grocery shopping lists prior to a snow storm include bread (indicating antecedent support), but only 300 of the grocery shopping lists include both bread and milk (indicating rule support), the respective confidence level of the accuracy of the rule is (300/900)*100%, or, 33%, i.e., the confidence value for the rule of "if purchase bread, then purchase milk" rule is 33%.

In at least some embodiments, a second statistical measurement algorithm 820 is configured to determine values for the popularity of a rule through a rule support measurement 822. The rule support measurement 822 includes a ratio of the number of records in the training data 544 that match the existing rule 524 as the numerator 824 to the total number of relevant records in the training data 544 in the denominator 826. In some embodiments, the numerator 824 and the numerator 814 are substantially similar. More simply, the ratio of record support to the total number of relevant records is indicative of the proportion of the training data 544 for which the entire rule, including both the antecedent factor(s) and consequent(s), are true. For example, and without limitation, if 400 records of the training data 544 includes both the purchase of bread and milk out of 1000 total records, then the value for the rule support 822 for the rule of "if purchase bread, then purchase milk" is 40%.

In at least some embodiments, a third statistical measurement algorithm 830 is configured to determine values for the popularity of the conditions through an antecedent support measurement 832. In some embodiments, particular combinations of the antecedent factors within a rule may not be that "popular" (i.e., frequent) within the inventory of existing rules 534 and altering the combination may facilitate altering the popularity of such antecedent factors combinations within the legacy expert system 530 to refine the associated rules accordingly to increase the popularity as a function of improving the analyses of the related subject matter. In some embodiments, the frequency of particular antecedent factor combinations may analyzed with respect to a specified threshold value. For example, and without limitation, if a particular combination is only cited three times out of 1000 combinations, the resultant 0.3% may be too low for keeping that particular combination intact as it is. Accordingly, potential refinement operations may include one or more of elimination the unpopular combinations, adding antecedent factors, removing antecedent factors, and generating new rules with more popular antecedent factor combinations (as discussed further herein).

The antecedent support measurement 832 includes a ratio of the number of records in the training data 544 that match the existing antecedent factor(s) as the numerator 834 to the total number of relevant records in the training data 544 in the denominator 836. In some embodiments, the numerator 834 and the denominator 816 are substantially similar and the denominator 836 and the denominator 826 are substantially similar. More simply, the ratio of antecedent(s) support to the total number of relevant records in the training data 544 is indicative of the proportion of the training data 544 for which the portion of the rule including the antecedent factor(s) are true. For example, and without limitation, if 900 of the grocery shopping lists prior to a snow storm include bread out of 1000 records, then the value for the antecedent support 832 for the portion of the rule that includes the antecedent factor of "if purchase bread" is 90%.

In at least some embodiments, a fourth statistical measurement algorithm 840 is configured to determine values for an improvement, i.e., lift measurement 842. The lift measurement 842 is unitless and includes a ratio of the confidence measurement of the rule in the numerator 844 (that is substantially identical to the confidence measurement 812) to the number of records in the training data 544 that match the existing consequent(s) as the denominator 846. The denominator 846 (support of the consequent) is determined in a manner similar to that for the antecedent support 832, i.e., the support of the consequent 846 is the ratio of the number of records that match the consequent to the total number of relevant records in the training data 544, i.e., the denominator 836. More simply, the ratio of consequent(s) support to the total number of relevant records in the training data 544 is indicative of the proportion of the training data 544 for which the portion of the rule including the consequent(s) are true. For example, and without limitation, if 200 of the grocery shopping lists prior to a snow storm include milk out of 1000 records, then the value for the consequent support 846 for the portion of the rule that includes the consequent of "then purchase bread" is 20%. If the established value for the confidence of the rule is 40%, i.e., 40% of the total population of the records of the training data 544 indicate a bread purchase, 40%/20% is 2, i.e., a rule that predicts whether people will purchase bread with 40% confidence will have a lift of 2. In general, as the calculated value for lift 842 approaches unity (1), the respective one or more antecedent factors have a decreasing effect on the probability of having the consequent. Conversely, as the calculated value for lift 842 increases away from unity (1), the respective one or more antecedent factors have an increasing effect on the probability of having the consequent.

Therefore, in some embodiments, the four statistical analyses of confidence measurement 812, rule support measurement 822, antecedent support measurement 832, and lift measurement 842 are analyzed. In some embodiments, without limitation, any combination of the four analyses, including execution of additional analyses, may be used to enable the machine learning-based expert system enrichment engine 550 and the process 600 as described herein. Accordingly, the quality of the existing rules 534 resident within the legacy expert system 530 is analyzed through determining 610 the statistical values for each identified rule such the existing rules are classified as either high quality or low quality as discussed further herein.

In embodiments, the process 600 proceeds to a determination operation 612, where a determination is made with respect to the aforementioned existing rules 534, and more specifically, if the existing rules 534 may be classified as either high quality or low quality. To be classified as a high-quality rule, the subject existing rule 534 is required to meet or exceed a threshold value for one or more of the four statistical analyses of confidence measurement 812, rule support measurement 822, antecedent support measurement 832, and lift measurement 842 as previously described. In some embodiments, the values of each of the four analyses 812, 822, 832, and 842 should meet or exceed the individual established threshold for each. In some embodiments, a blended value resulting from an amalgamation of the four measurement analyses 812, 822, 832, and 842 may be calculated and determined to meet or exceed a respective single threshold value. Regardless of the mechanism employed to implement the determination operation 612, there may be existing rules 534 that are determined to be of satisfactory quality, i.e., they meet or exceed the respective threshold values for high-quality rule. Such high-quality rules receive a "Yes" determination from the determination operation 612 and are saved 614 as the high-quality rules 546 (with the respective measurement statistics) in the data storage system 508. Accordingly, the high-quality rules 546 are enriched with the respective measurement statistics that support a high-quality designation through documenting that the respective threshold values are at least met.

Figure 6B:
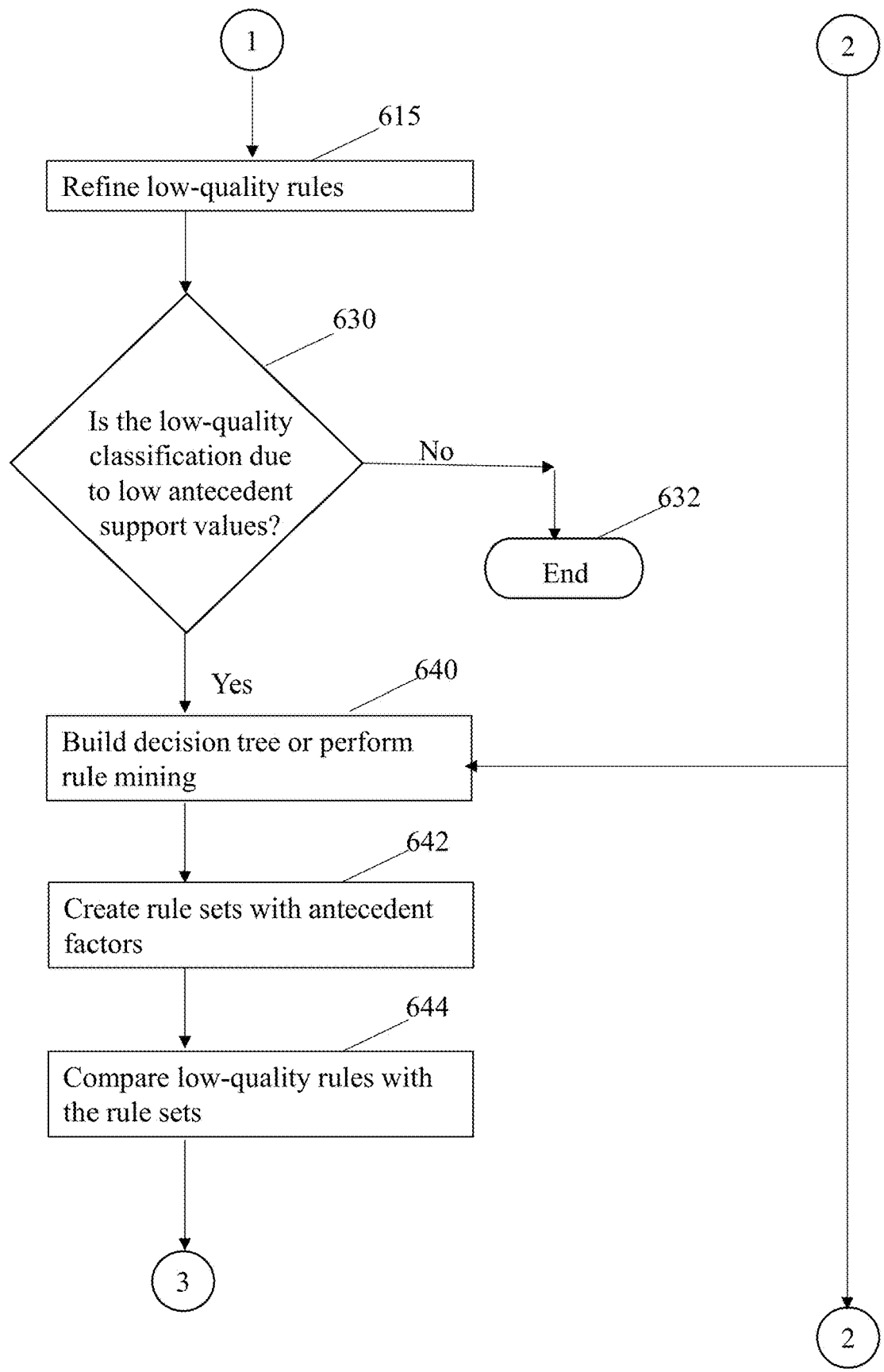
FIG. 6B is a continuation of the flowchart from FIG. 6A, in accordance with some embodiments of the present disclosure.

Also referring to FIG. 6B, a continuation of the process 600 from FIG. 6A, in one or more embodiments, in contrast to the high-quality rules, and regardless of the mechanism employed to implement the determination operation 612, there may be existing rules 534 that are determined to be of less than satisfactory quality, i.e., they do not meet the respective threshold values for high-quality rules. Such low-quality rules 555 receive a "No" determination from the determination operation 612 and the low-quality rules 555 are refined 615, as discussed further herein.

Referring again to FIG. 6A and FIG. 5, the identified training data 544 is injected 620 into the engine 550 to facilitate building 622 one or more machine learning (ML) rule models 556 from the training data 544. The ML rule models 556 are configured to generate 624, through data mining of the training data 544, one or more frequent sets 558 that may be used to further refine the legacy expert system 530. Each frequency set 558 include antecedent factor combinations that are more likely to be found in the training data 544 than other combinations. For example, one possible frequent set 558 of antecedent factors that may be generated through processing the training data 544 through the ML rule model 556 is:

(1) [Fund R&D=GO] AND (2) [Success of R&D=Succeed] AND (3) [Launch Product=NO], where a first (1) antecedent factor, a second (2) antecedent factor, and a third (3) antecedent factor are identified.

Referring again to FIG. 6B and FIG. 5, in order to execute the low-quality rules, refine operation 615, a determination 630 is made with respect to a if the low-quality classification determined with respect to the determination operation 612 (shown in FIG. 6A) is due to values of the popularity of the conditions 830, i.e., the antecedent support 832 that do not meet the respective threshold. If the response to the determination operation 630 is "No", this portion of the process 600 ends 632.

In some embodiments, the determination operation 612 may be expanded in scope to include the confidence measurement 812 (which includes an antecedent factor relationship in the denominator 816 that is substantially similar to the numerator of the antecedent support measurement 832). In addition, the determination operation 612 may be expanded in scope to include the rule support measurement 822 through analysis of the numerator 824 with respect to the respective antecedents. For example, a low value for the rule support 822 indicates the respective rule is not frequently, and in some cases, rarely, seen among the records. A change to the antecedent support for the respective rule through addition of, removal of, or altering of the antecedent factors facilitate generating a new rule from the original rule that retains at least some similarity to the original rule, however, is more popular. Moreover, the determination operation 612 may be expanded in scope to include the lift measurement 842. For example, through limiting the changes to one antecedent of an original rule to an addition, a removal, or alteration, a new rule will be generated from the original rule, where the new rule will have a better (greater) lift measurement that is similar to the original rule. Accordingly, using the four statistical measurement algorithms 800 to determine if the rule meets or exceeds a threshold for satisfactory quality facilitates attainment of an optimized rule.

If the response to the determination operation 630 is "Yes", a decision tree may be built 640 or rule mining may be performed as described further. Also referring to FIG. 9, a graphical diagram is provided illustrating an example decision tree 900 (shown as 560 in FIG. 5). Further, referring to FIG. 10, a tabular diagram is provided illustrating an example rule set 1000 (shown as 562 in FIG. 5) that may be derived from the example decision tree 900 shown in FIG. 9. In addition, the example rule set 1000 may be derived from rule mining using the training data 544, one or more of the ML rule models 556, and the frequent sets 558. The example decision tree 900 includes a first antecedent factor 902, a second antecedent factor 904, a third antecedent factor 906, a fourth antecedent factor 908, and the respective predictions/recommendations 910 (shown as 564 in FIG. 5). Accordingly, one or more rule sets 1000 are created 642 with one or more antecedent factors 902, 904, 906, 908.

Figure 6C:
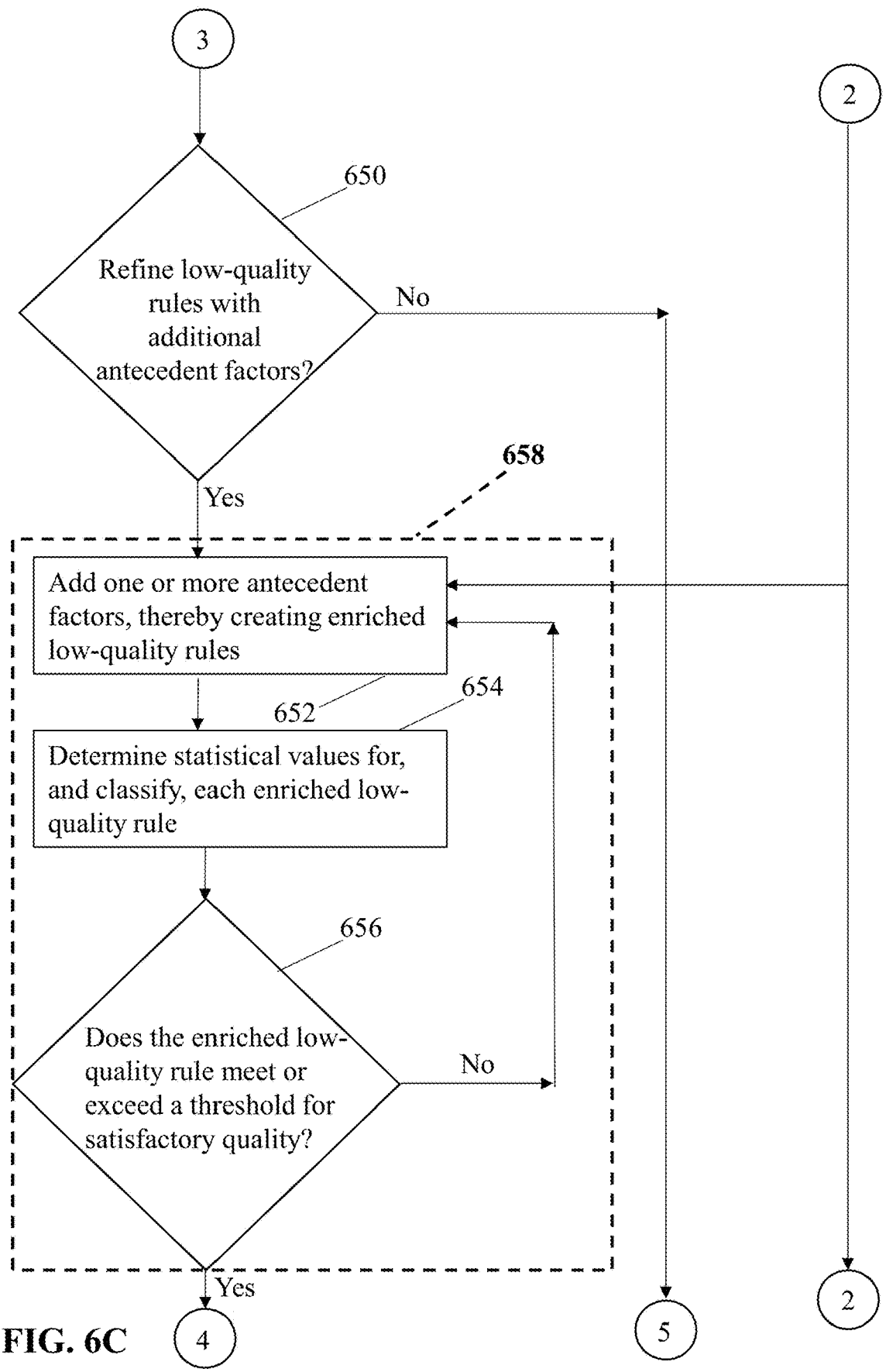
FIG. 6C is a continuation of the flowchart from FIG. 6B, in accordance with some embodiments of the present disclosure.

In some embodiments, and also referring to FIG. 6C, a continuation of the process 600 from FIG. 6B, and continuing to refer to FIGS. 5, 6A, and 6B, the low-quality rules 555 are compared 644 with the rule sets 562 and a determination 650 is made to refine the low-quality rules 555 with insertion of additional antecedent factors. If the response to the determination operation 650 is "Yes", one or more additional antecedent factors are added 652 to a respective rule set 562 that is at least partially comparable to the respective low-quality rule 555, thereby creating enriched low-value rules. In some embodiments, the additional antecedent factors are derived from one or more of the frequent sets 558. Values for the previously discussed statistical measurements are determined 654 for the enriched low-quality rules as the statistical measurement algorithms 554 (shown in FIG. 8 as 800) are applied to the enriched low-quality rules in a manner similar to that described for the operation 610.

Also, in some embodiments, the process 600 proceeds to a determination operation 656, where a determination 656 is made with respect to the aforementioned enriched low-quality rules, and more specifically, if the enriched low-quality rules may be classified as either high quality or low quality in a manner substantially similar to the determination operation 612. A "No" determination returns the process 600 to the add antecedent factors operation 652. In some embodiments, and also referring to FIG. 6D, a continuation of the process 600 from FIG. 6C, and continuing to refer to FIGS. 5, 6A, 6B, and 6C, the resultant loop 658 is executed until the determination operation 656 results in a "Yes" determination, where the refined rule is transmitted 660 to a user to review and determine possible addition to the inventory of refined rules 566, and this portion of the process 600 ends 662.

In some embodiments, the low-quality rules 555 are compared 644 with the rule sets 562 and a determination 650 is made with respect to refining the low-quality rules 555 with addition of additional antecedent factors. If the response to the determination operation 650 is "No", one or more additional antecedent factors are removed 670 to a respective rule set 562 that is at least partially comparable to the respective low-quality rule 555, thereby creating enriched low-value rules. For example, and without limitation, redundant antecedent factors may be specifically targeted for removal. In some embodiments, the identification of the antecedent factors to be removed are derived from one or more of the frequent sets 558. Values for the previously discussed statistical measurements are determined 672 for the enriched low-quality rules as the statistical measurement algorithms 554 (shown in FIG. 8 as 800) are applied to the enriched low-quality rules in a manner similar to that described for the operations 610 and 656.

Also, in some embodiments, the process 600 proceeds to a determination operation 674, where a determination 674 is made with respect to the aforementioned enriched low-quality rules, and more specifically, if the enriched low-quality rules may be classified as either high quality or low quality in a manner substantially similar to the determination operations 612 and 658. A "No" determination returns the process 600 to the remove antecedent factors operation 670. In some embodiments, the resultant loop 675 is executed until the determination operation 674 results in a "Yes" determination, where the refined rule is transmitted 676 to a user to review and determine possible addition to the inventory of refined rules 566, and this portion of the process 600 ends 678.

In some embodiments, the antecedent factors addition mechanisms (as described with respect to the loop 658) and the antecedent factors removal mechanisms (as described with respect to the loop 675) may be executed on one or more low-quality rules 555 serially.

Figure 6D:
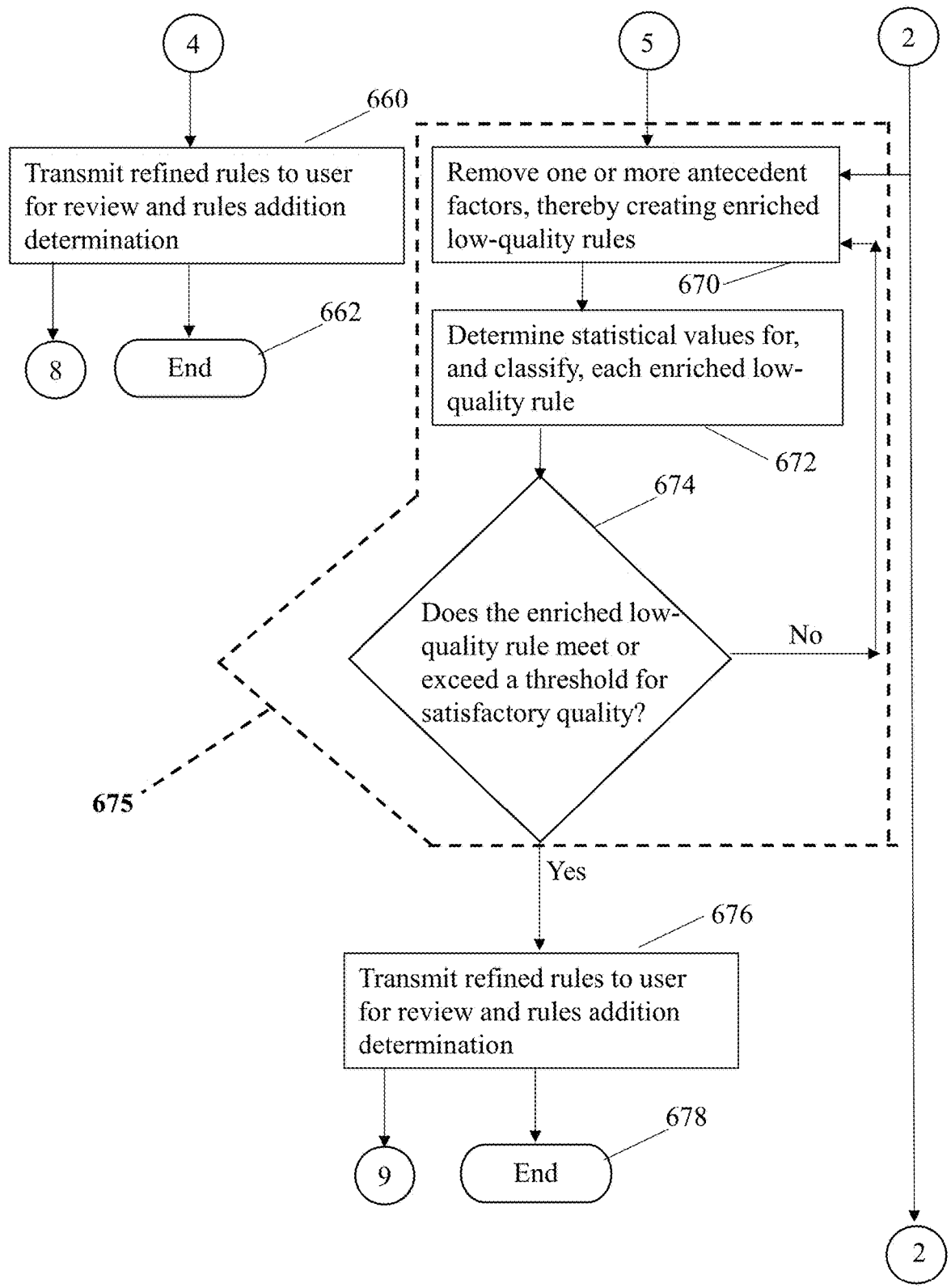
FIG. 6D is a continuation of the flowchart from FIG. 6C, in accordance with some embodiments of the present disclosure.
Figure 6E:
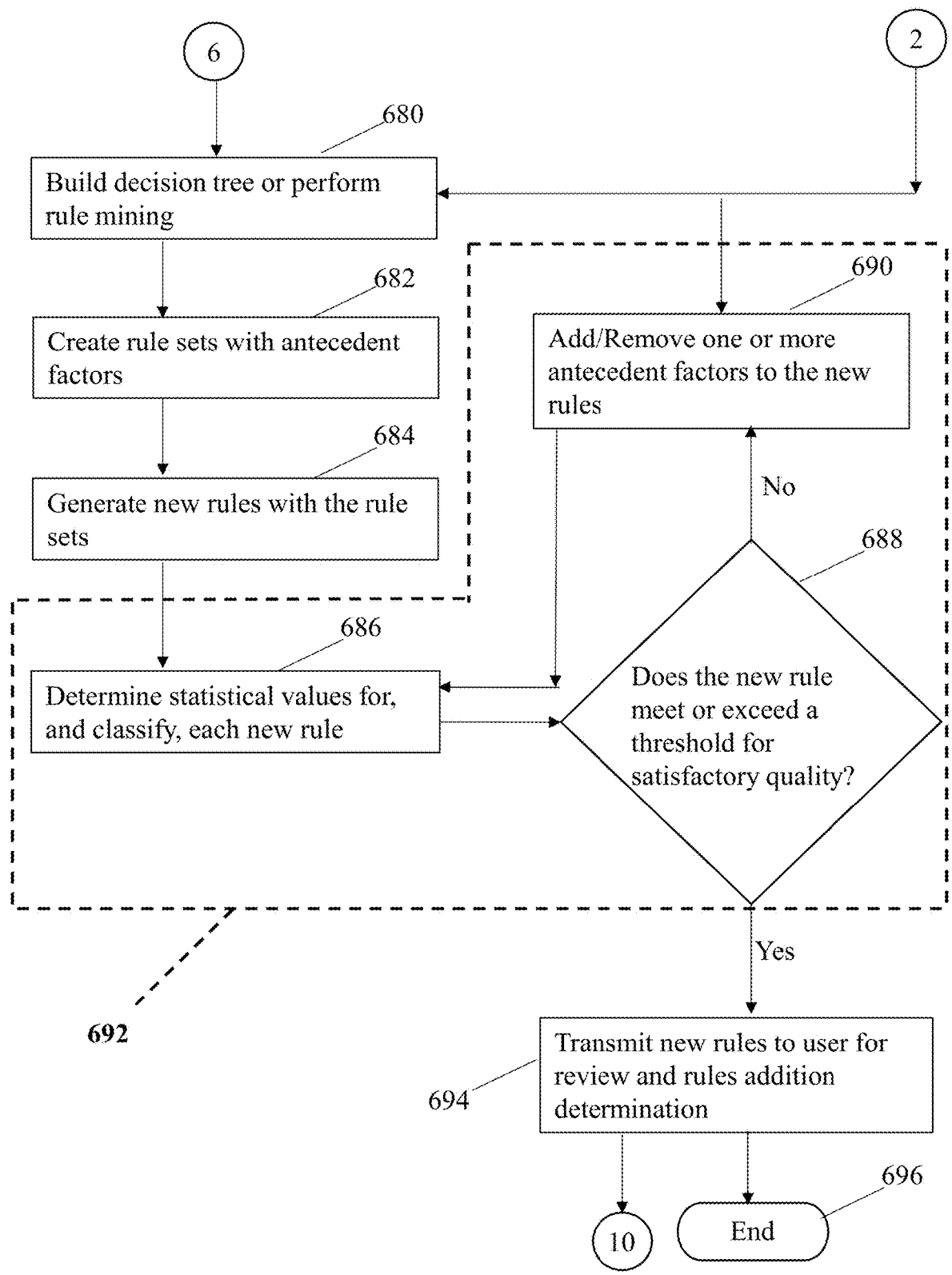
FIG. 6E is a continuation of the flowchart from FIG. 6D, in accordance with some embodiments of the present disclosure.

In some embodiments, and also referring to FIG. 6E, a continuation of the process 600 from FIG. 6D, and continuing to refer to FIGS. 5, 6A, 6B, 6C, and 6D, the identified training data 544 is injected 620 into the engine 550 to facilitate building 622 one or more machine learning (ML) rule models 556 from the training data 544. A decision tree may be built 680 or rule mining may be performed as previously described for the build operation 640. One or more rule sets 562 are created 682 with one or more antecedent factors and one or more new rules are generated 684 from the created rule sets 562. Values for the previously discussed statistical measurements are determined 686 for the new rules as the statistical measurement algorithms 554 (shown in FIG. 8 as 800) are applied to the enriched low-quality rules in a manner similar to that described for the operations 610, 656, and 672. Also, in some embodiments, the process 600 proceeds to a determination operation 688, where a determination 688 is made with respect to the new rules, and more specifically, if the new rules may be classified as either high quality or low quality in a manner substantially similar to the determination operations 612, 658, and 674. A "No" determination advances the process 600 to an add and/or remove antecedent factors operation 690. In some embodiments, the resultant loop 692 is executed until the determination operation 688 results in a "Yes" determination. The new rule is transmitted 694 to a user to review and determine possible addition to an inventory of new rules 568, where the new rules 568 are enriched with respect to the existing rules 534 of the legacy expert system 530 as described herein, and this portion of the process 600 ends 696.

In some embodiments, and also referring to FIG. 6F, a continuation of the process 600 from FIGS. 6A-6E, and also referring to FIG. 5, the process 600 concludes with assembling 699 the enriched expert system 570 with the various enriched rules. Specifically, the enriched expert system 570 includes the high-quality rules 546 with measurement statistics associated with the save operation 614, the refined rules 566 generated through additional antecedent factors associated with the transmit operation 660, the refined rules 566 generated through removal of antecedent factors associated with the transmit operation 676, and the new rules 568 associated with the transmit operation 694.

The system, computer program product, and method as disclosed herein facilitates overcoming the disadvantages and limitations of known systems and methods for enriching existing legacy expert systems. Specifically, the present disclosure describes an automated process and system to enrich legacy expert systems through refinement of the existing rules therein. In some embodiments, the systems and methods described herein leverage big data to provide insights into the rules of the legacy expert systems through statistical analyses to facilitate the generation of more plausible predictions and recommendations that may not be available through an unrefined legacy expert system. Such analyses facilitate finding and improving unsatisfying rules. In addition to generating and offering new rules to enrich existing expert systems, the aforementioned rules evaluations based on statistical algorithms identify those rules that are outdated or otherwise ineffective at providing satisfactory predictions and recommendations in light of additional data. Such identification facilitates preparing the rules for automatic updating thereof. In some embodiments, certain rules may be simply removed, and in some cases, without replacement of equivalent rules. In some embodiments, the use of modern machine learning leverages ML rule models to enrich the rules of the legacy expert systems, thereby generating hybrid expert systems that retain at least a portion of the features of the legacy expert system; however, the hybrid expert systems also include enriched rules more emblematic of modern expert systems. Enriching legacy expert systems rather than wholesale replacement thereof is preferred by some users of the legacy expert systems due to familiarity and budgetary constraints.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
one or more processing devices and at least one memory device operably coupled to the one or more processing devices, the one or more processing devices are configured to:
identify a legacy expert system to be enriched, the legacy expert system containing existing rules used by an inference engine of the legacy expert system to generate predictions based on data in a knowledge base;
identify big data to enrich the legacy expert system;
identify one or more of the existing rules and one or more antecedent factors for each of the one or more existing rules;
input the big data into the legacy expert system to determine, for each existing rule of the one or more existing rules, an accuracy of the existing rule based on a statistical measurement, wherein the legacy expert system processes the big data to generate a prediction using the existing rule, and the prediction generated using the existing rule is compared to a ground truth to generate the statistical measurement for the existing rule;
determine, based on the statistical measurements, at least a first portion of the existing rules of the one or more existing rules do not meet a threshold value for established quality requirements, thereby to identify one or more low-quality rules;
identify one or more frequent sets of antecedent factors associated with each low-quality rule of the one or more low-quality rules, wherein each frequent set of antecedent factors of the one or more frequent sets of antecedent factors is established as a frequent set through at least meeting a threshold frequency of occurrence within the big data;
identify at least one existing rule for refinement by comparing the one or more antecedent factors of each existing rule of the one or more existing rules with the one or more frequent sets of antecedent factors that were established by at least meeting the threshold frequency of occurrence within the big data; and
enrich the legacy expert system through refinement of the at least one existing rule.

2. The system of claim 1, wherein the one or more processing devices are further configured to:
refine the one or more low-quality rules through addition of one or more antecedent factors thereto, thereby to create one or more first enriched low-quality rules; and
save the one or more first enriched low-quality rules for insertion into an enriched legacy system.

3. The system of claim 1, wherein the one or more processing devices are further configured to:
refine the one or more low-quality rules through removal of one or more antecedent factors therefrom, thereby to create one or more second enriched low-quality rules; and
save the one or more second enriched low-quality rules for insertion into the enriched legacy system.

4. The system of claim 1, wherein the one or more processing devices are further configured to:
remove the one or more low-quality rules from the legacy expert system.

5. The system of claim 1, wherein the one or more processing devices are further configured to:
determine at least a second portion of the existing rules of the one or more existing rules that at least meet the threshold value for the established quality requirements, thereby to identify one or more high-quality rules; and
save the one or more high-quality rules for insertion into the enriched legacy system.

6. The system of claim 5, wherein the one or more processing devices are further configured to:
enrich the one or more high-quality rules with respective measurement statistics that support a high-quality designation through documentation indicating that the respective threshold values are at least met.

7. The system of claim 1, wherein the one or more processing devices are further configured to:
determine one or more new rules that at least meet the threshold value for the established quality requirements; and
save the one or more new rules for insertion into the enriched legacy system.

8. The system of claim 1, wherein the one or more processing devices are further configured to:
- inject the big data into a machine learning engine;
- build one or more machine learning models from the injected big data;
- execute, through the one or more machine learning models, data mining on the injected big data; and
- generate, subject to the data mining, the one or more frequent sets of antecedent factors.

9. The system of claim 1, wherein the one or more processing devices configured to determine the accuracy of the existing rules are further configured to:
- determine one or more statistical measurement values for each existing rule of the one or more existing rules; and
- compare each statistical measurement value of the one or more statistical measurement values with the respective threshold value for the established quality requirements.

10. A computer program product, the computer program product comprising:
- one or more computer-readable storage media; and
- program instructions collectively stored on the one or more computer-readable storage media, the program instructions comprising:
  - program instructions to identify a legacy expert system to be enriched, the legacy expert system containing existing rules used by an inference engine of the legacy expert system to generate predictions based on data in a knowledge base;
  - program instructions to identify big data to enrich the legacy expert system;
  - program instructions to identify one or more of the existing rules and one or more antecedent factors for each of the one or more of the existing rules;
  - program instructions to input the big data into the legacy expert system to determine, for each of the one or more existing rules, an accuracy of the existing rule based on a statistical measurement, wherein the legacy expert system processes the big data to generate a prediction using the existing rule, and the prediction generated using the existing rule is compared to a ground truth to generate the statistical measurement for the existing rule;
  - program instructions to determine, based on the statistical measurements, one or more portions of the existing rules of the one or more existing rules do not meet a threshold value for established quality requirements, thereby to identify one or more low-quality rules;
  - program instructions to identify one or more frequent sets of antecedent factors associated with each low-quality rule of the one or more low-quality rules, wherein each frequent set of antecedent factors of the one or more frequent sets of antecedent factors is established as a frequent set through at least meeting a threshold frequency of occurrence within the big data;
  - program instructions to identify at least one existing rule for refinement by comparing the one or more antecedent factors of each existing rule of the one or more existing rules with the one or more frequent sets of antecedent factors that were established by at least meeting the threshold frequency of occurrence within the big data; and
  - program instructions to enrich the legacy expert system through refinement of the at least one existing rule.

11. The computer program product of claim 10, further comprising:
- program instructions to refine a first portion of the one or more low-quality rules through addition of one or more antecedent factors thereto, thereby to create one or more first enriched low-quality rules;
- program instructions to refine a second portion of the one or more low-quality rules through removal of one or more antecedent factors therefrom, thereby to create one or more second enriched low-quality rules;
- program instructions to save the one or more first enriched low-quality rules and the one or more second enriched low-quality rules for insertion into the enriched legacy system;
- program instructions to remove a third portion of the one or more low-quality rules from the legacy expert system;
- program instructions to determine a fourth portion of the one or more existing rules at least meet the threshold value for the established quality requirements, thereby to identify one or more high-quality rules;
- program instructions to save the one or more high-quality rules for insertion into the enriched legacy system;
- program instructions to determine one or more new rules that at least meet the threshold value for the established quality requirements; and
- program instructions to save the one or more new rules for insertion into the enriched legacy system.

12. A computer-implemented method comprising:
- identifying a legacy expert system to be enriched, the legacy expert system containing existing rules used by an inference engine of the legacy expert system to generate predictions based on data in a knowledge base;
- identifying big data to enrich the legacy expert system;
- identifying one or more of the existing rules and one or more antecedent factors for each of the one or more of the existing rules;
- inputting the big data into the legacy expert system to determine, for each of the one or more existing rules, an accuracy of the existing rule based on a statistical measurement, wherein the legacy expert system processes the big data to generate a prediction using the existing rule, and the prediction generated using the existing rule is compared to a ground truth to generate the statistical measurement for the existing rule;
- determining, based on the statistical measurements, at least a first portion of the existing rules of the one or more existing rules do not meet a threshold value for established quality requirements, thereby identifying one or more low-quality rules;
- identifying one or more frequent sets of antecedent factors associated with each low-quality rule of the one or more low-quality rules, wherein each frequent set of antecedent factors of the one or more frequent sets of antecedent factors is established as a frequent set through at least meeting a threshold frequency of occurrence within the big data;
- identifying at least one existing rule for refinement by comparing the one or more antecedent factors of each existing rule of the one or more existing rules with the one or more frequent sets of antecedent factors that were established by at least meeting the threshold frequency of occurrence within the big data; and
- enriching the legacy expert system through refining the at least one existing rule.

13. The method of claim 12, wherein the enriching the legacy expert system comprises:
refining the one or more existing rules through adding one or more antecedent factors thereto, thereby creating one or more first enriched low-quality rules; and
saving the one or more first enriched low-quality rules for insertion into an enriched legacy system.

14. The method of claim 12, wherein the enriching the legacy expert system comprises:
refining the one or more existing rules through removing one or more antecedent factors therefrom, thereby creating one or more second enriched low-quality rules; and
saving the one or more second enriched low-quality rules for insertion into the enriched legacy system.

15. The method of claim 12, wherein the enriching the legacy expert system comprises:
removing the one or more existing rules from the legacy expert system.

16. The method of claim 12, further comprising:
determining at least a second portion of the existing rules of the one or more existing rules at least meet the threshold value for the established quality requirements, thereby identifying one or more high-quality rules; and
saving the one or more high-quality rules for insertion into the enriched legacy system.

17. The method of claim 16, wherein the enriching the legacy expert system comprises:
enriching the one or more high-quality rules with respective measurement statistics that support a high-quality designation through documenting that the respective threshold values are at least met.

18. The method of claim 12, further comprising:
determining one or more new rules that at least meet the threshold value for the established quality requirements; and
saving the one or more new rules for insertion into the enriched legacy system.

19. The method of claim 12, wherein identifying one or more frequent sets of antecedent factors comprises:
injecting the big data into a machine learning engine;
building one or more machine learning models from the injected big data;
executing, through the one or more machine learning models, data mining on the injected big data; and
generating, subject to the data mining, the one or more frequent sets of antecedent factors.

20. The method of claim 12, wherein the determining the accuracy of the existing rules further comprises:
determining one or more statistical measurement values for each existing rule of the one or more existing rules; and
comparing each statistical measurement value of the one or more statistical measurement values with the respective threshold value for the established quality requirements.

* * * * *